United States Patent [19]
Nakagawa et al.

[11] Patent Number: 5,247,219
[45] Date of Patent: Sep. 21, 1993

[54] CONTROL APPARATUS OF MAGNETIC BEARING

[75] Inventors: Tohru Nakagawa, Hirakata; Masakazu Nakashima, Neyagawa; Akira Takara, Moriguchi, all of Japan

[73] Assignee: Matsushita Electric Industrial Co., Ltd., Osaka, Japan

[21] Appl. No.: 904,640

[22] Filed: Jun. 26, 1992

[30] Foreign Application Priority Data

Jun. 27, 1991 [JP] Japan .................... 3-156933

[51] Int. Cl.⁵ .................... H01K 7/09; H01H 47/00
[52] U.S. Cl. .................... 310/90.5; 361/144
[58] Field of Search .................... 310/90, 90.5; 318/629; 361/144; 324/207.11

[56] References Cited

U.S. PATENT DOCUMENTS

| | | | |
|---|---|---|---|
| 4,154,489 | 5/1979 | Lyman | 310/90.5 |
| 4,686,404 | 8/1987 | Nakazeki et al. | 310/90.5 |
| 4,697,128 | 9/1987 | Matsushita et al. | 310/90.5 |
| 4,839,550 | 6/1989 | Mizuno et al. | 310/90.5 |
| 4,841,212 | 6/1989 | Matsushita et al. | 310/90.5 |
| 4,885,491 | 12/1989 | Hiyama | 310/90.5 |
| 4,912,387 | 3/1990 | Moulds, III | 310/90.5 |
| 5,084,643 | 1/1992 | Chen | 310/90.5 |
| 5,155,402 | 10/1992 | Bichler | 310/90.5 |

FOREIGN PATENT DOCUMENTS

| | | | |
|---|---|---|---|
| 0291931 | 11/1988 | European Pat. Off. | 310/90.5 |
| 0037322 | 2/1984 | Japan | 310/90.5 |
| 0168915 | 9/1985 | Japan | 310/90.5 |
| 0316409 | 12/1988 | Japan | 310/90.5 |
| 0083916 | 3/1989 | Japan | 310/90.5 |
| 0124242 | 5/1991 | Japan | 310/90.5 |

Primary Examiner—Steven L. Stephan
Assistant Examiner—C. LaBalle
Attorney, Agent, or Firm—Wenderoth, Lind & Ponack

[57] ABSTRACT

A control apparatus of a magnetic bearing controls electromagnets so that both a displacement deviation of a center of gravity of a rotary shaft and an angle of twist around the center of gravity of the rotary shaft become 0, thereby supporting the rotary shaft in space by the magnetic force of the electromagnets. The apparatus includes $\theta_X$ and $\theta_Y$ control devices for controlling angles $\theta_X$ and $\theta_Y$ of twist of the two degrees of freedom of a rotational motion orthogonal to each other around the center of gravity and perpendicular to an axial direction of the rotary shaft, a cross feedback being produced so that both a feedback signal of the rotary angle $\theta_X$ and a feedback signal of the rotary angle $\theta_Y$ are respectively fed back as cross feedback signals to the $\theta_Y$ and $\theta_X$ control devices. A rotational speed detecting device for detecting a rotational number of the rotary shaft. Each of the control devices includes a break frequency and gain value varying device which has a break frequency not larger than a reply frequency of the entire control apparatus with respect to the cross feedback signal, the varying device varying the break frequency of the lowpass filter in inverse proportion to the rotational speed of the rotary shaft, and varying a gain value of the cross feedback signal in proportion to the detected rotational speed of the rotary shaft.

4 Claims, 6 Drawing Sheets

CONTROL APPARATUS OF MAGNETIC BEARING

BACKGROUND OF THE INVENTION

The present invention relates to an active control-type control apparatus of a magnetic bearing.

A magnetic bearing is superior in many points, for example that it can be rotated at ultrahigh speeds without lubrication being taken since a rotary body of the magnetic bearing is supported without contact in space by the magnetic force thereof. However, when the rotary shaft is rotated at ultrahigh speeds, a control system of the magnetic bearing disadvantageously becomes unstable as a result of the gyro-effect.

Conventionally, a cross feedback method has been employed in the control system of the magnetic bearing having two degrees of freedom for the rotational motion so as to eliminate the above-described phenomenon, that is, the unstable state of the control system during rotation at ultrahigh speeds resulting from the gyro-effect.

Figure 4:
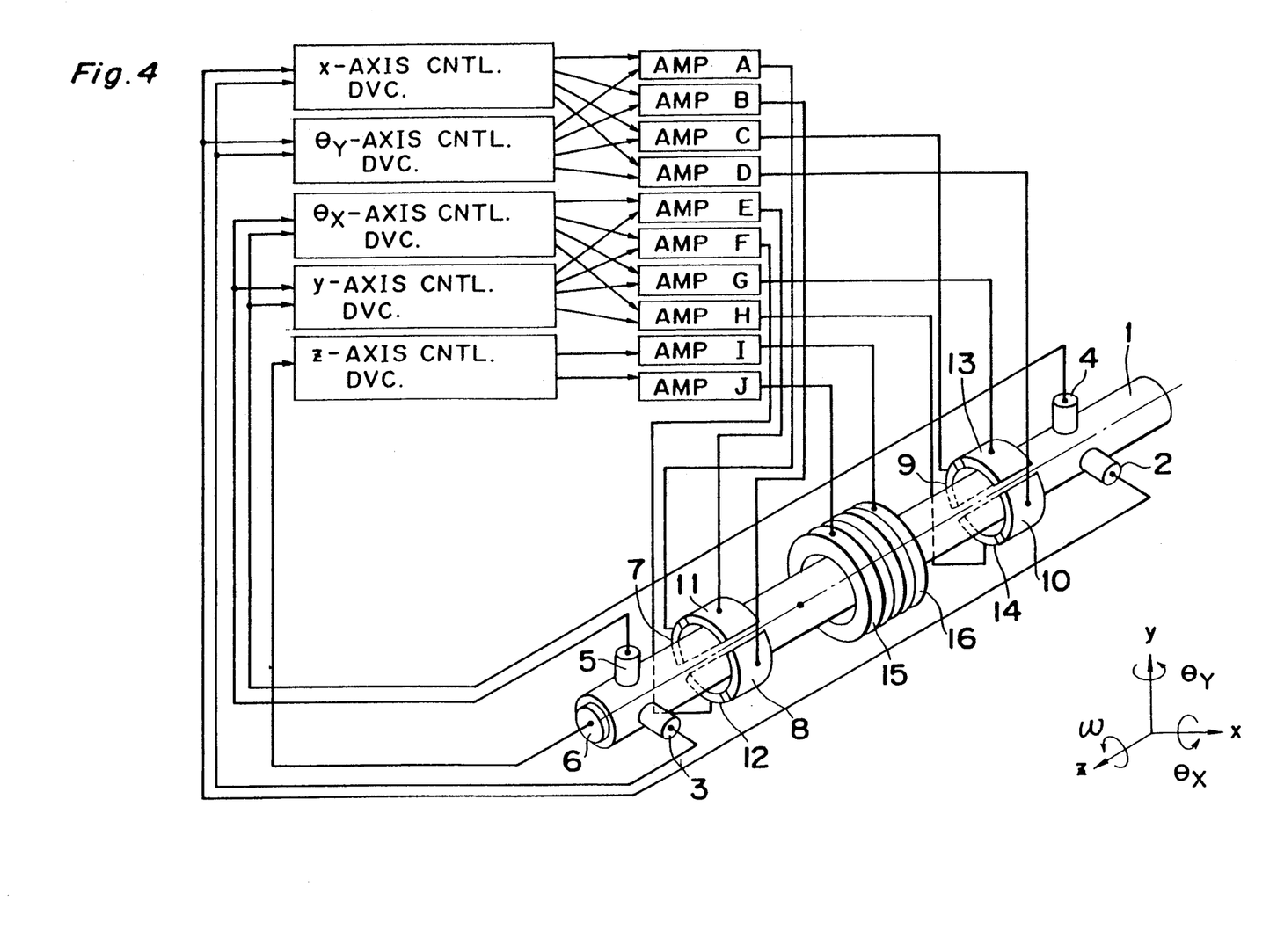
FIG. 4 is a perspective view of the entire structure of a magnetic bearing control system.
Figure 5:
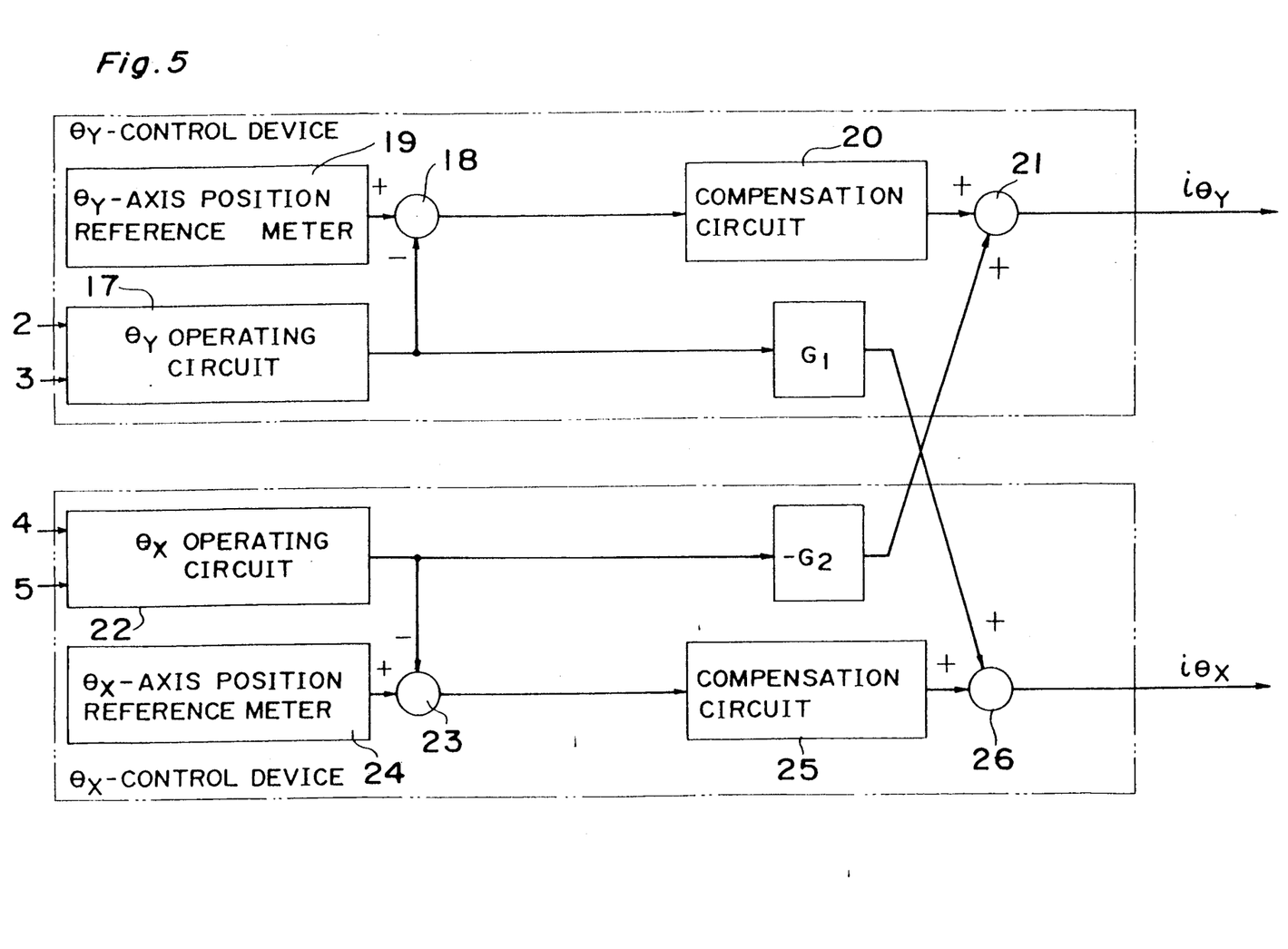
FIG. 5 is a block diagram of a conventional rotational motion control device.

The structure of a conventional magnetic bearing control apparatus of the type referred to above is indicated in FIGS. 4 and 5.

More specifically, the control apparatus which controls three degrees of freedom for the translation motion (x, y, z) of the center of gravity G of a rotary shaft 1 and two degrees of freedom for the rotational motion ($\theta_X$, $\theta_Y$) around the center of gravity G are provided with displacement sensors 2 and 3 for measuring a displacement in an x-axis direction, displacement sensors 4 and 5 for measuring a displacement in a y-axis direction, and a displacement sensor 6 for measuring a displacement in a z-axis direction. The rotating state of the rotary shaft 1 is detected by these sensors. Moreover, electromagnets 7 through 14 are provided to impress a force to the rotary shaft 1, and electromagnets 15 and 16 are mounted to impress a force in the z-axis direction.

The rotational motion of the rotary shaft 1 measured by the displacement sensors is fed back to the five control devices, namely, the control devices of three degrees of freedom for the translation motion and two degrees of freedom for the rotational motion. Each of the five control devices outputs a current instructing signal for the electromagnets to respective amplifiers A-J based on the feedback signal so as to keep the rotary shaft 1 floating in a predetermined state. The amplifiers A-J then amplify the current instructing signal, feeding a current to the electromagnets 7-16, thus impressing a force to the rotary shaft 1.

The magnetic bearing control apparatus is generally formed in the above-described fashion. Now, the $\theta_Y$-axis control device and $\theta_X$-axis control device of FIG. 4 will be more specifically described for explanation of the conventional compensation of the gyro-effect, i.e., the cross feedback method.

FIG. 5 is a block diagram of the two control devices respectively for controlling the $\theta_Y$-axis and $\theta_X$-axis rotational motion. A rotational displacement $\theta_Y$ around the center of gravity of the rotary shaft 1 is operated by a $\theta_Y$ operating circuit 17 from output signals of the x-axis displacement sensors 2 and 3, and output to a deviation circuit 18. The deviation circuit 18 obtains the difference between a $\theta_Y$-axis position reference signal generated from a $\theta_Y$-axis position reference meter 19 and the rotational displacement $\theta_Y$, outputs a deviation signal to a compensation circuit 20. After processing the deviation signal by P.I.D. compensation or phase compensation, the compensation circuit 20 outputs a control signal to an adder 21.

Likewise, in the $\theta_X$-axis control device, a rotational displacement $\theta_X$ around the center of gravity of the rotary shaft 1 is operated by a $\theta_X$-axis operating circuit 22 from output signals of the y-axis displacement sensors 4 and 5, and outputs a signal to a deviation circuit 23. The deviation circuit 23 obtains the difference between a $\theta_X$-axis position reference signal from a $\theta_X$-axis position reference meter 24 and the rotational displacement $\theta_X$ and then outputs a deviation signal to a compensation circuit 25. In the compensation circuit 25, the deviation signal is subjected to P.I.D. compensation or phase compensation, and the resultant control signal is output to an adder 26.

The two degrees of freedom in the rotational motion are stabilized in the foregoing manner of control. However, the magnetic bearing becomes unstable when the rotary shaft 1 is rotated at ultrahigh speeds. The cross feedback method mentioned earlier is accordingly carried out to eliminate the unstable state between the two degrees of freedom in the rotational motion. In other words, the adder 21 adds the $\theta_Y$ control signal to a signal obtained by multiplying the $\theta_X$ rotational displacement by a gain ($-G_2$), thereby generating a current instruction $i\theta_Y$. At the same time, the adder 26 adds the $\theta_X$ control signal to a signal obtained by multiplying the $\theta_Y$ rotational displacement by a gain ($G_1$), thereby outputting a current instruction $i\theta_X$. The effect of this cross feedback method will be described with reference to a diagram of the gain of the rotational motion control system.

Figure 6:
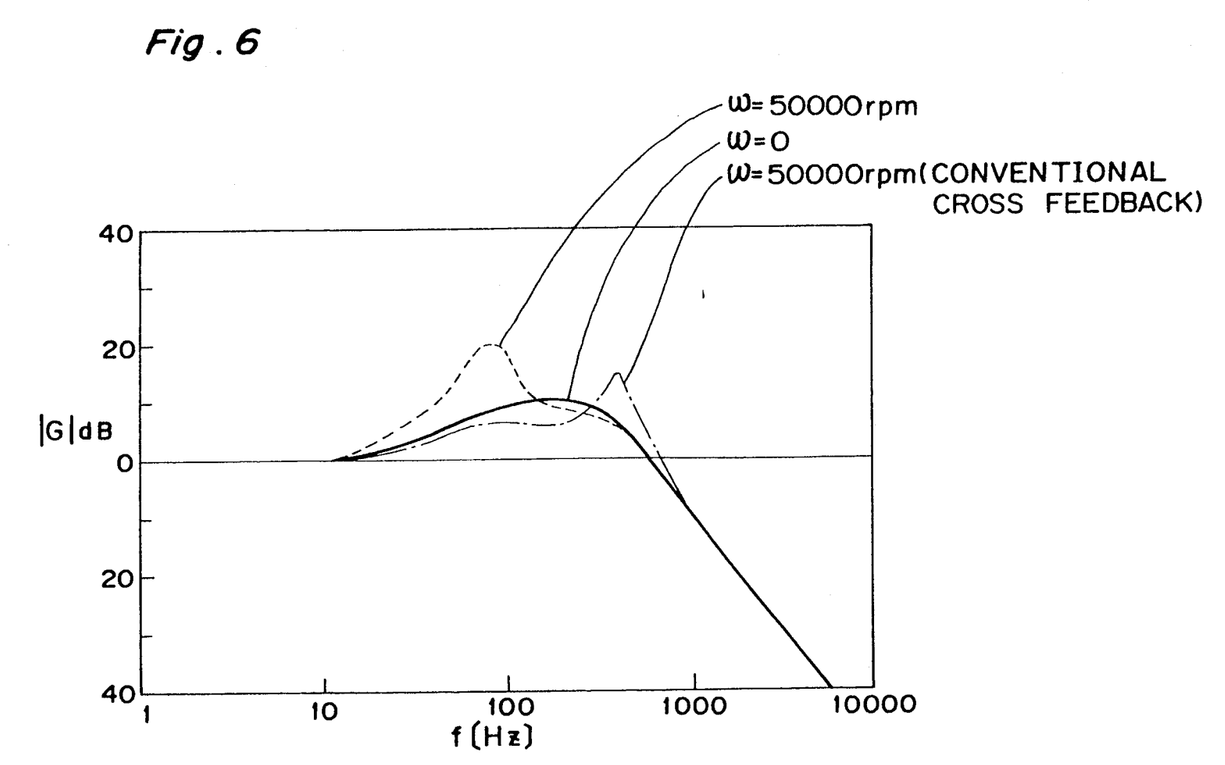
FIG. 6 is a diagram of a gain of a closed-loop transfer function of a rotational motion control system for explaining of the conventional compensation of the gyro-effect.

In the diagram of FIG. 6, the gain of the rotational motion control system is compared between when the cross feedback method is used (shown by an alternate long and short dashed line) and when the cross feedback method is not used (shown by a dotted line). A frequency response shown by a solid line represents a closed-loop transfer function of the rotational motion control system when the rotational speed $\omega$ of the rotary shaft 1 is equal to 0. A peak value at this t is 10dB (f=200 Hz). When the rotary shaft 1 is rotated at $\omega$=50000 rpm, the closed-loop transfer function is turned as indicated by the alternate long and short dashed line in FIG. 6, with a peak value of 20dB (f=85 Hz). The control system becomes unstable. Meanwhile, if the conventional cross feedback method is tried in the manner as indicated in FIG. 5, such a frequency response as drawn by the dotted line is obtained, whereby the above peak value 20dB (f=85 Hz) is improved.

In the above-described structure, when the frequency is relatively high, for example, 400 Hz in FIG. 6, the peak value is 15dB, which that the control efficiency has deteriorated.

SUMMARY OF THE INVENTION

The object of the present invention is therefore to provide a control apparatus of a magnetic bearing capable of having a high control efficiency in a wide range of response frequencies of the control system.

In accomplishing these and other objects, according to one aspect of the present invention, there is provided a control apparatus of a magnetic bearing which controls electromagnets so that both a displacement deviation of a center of gravity of a rotary shaft and an angle of twist around the center of gravity of the rotary shaft become 0, thereby supporting the rotary shaft in space by a magnetic force of the electromagnets, the apparatus comprising:

$\theta_X$ and $\theta_Y$ control devices for controlling rotary angles $\theta_X$ and $\theta_Y$ of twist of two degrees of freedom of a rotational motion orthogonal to each other around the center of gravity and perpendicular to an axial direction the rotary shaft, both a feedback signal of the rotary angle $\theta_X$ and a feedback signal of the rotary angle $\theta_y$ being respectively fed back as cross feedback signals to the $\theta_Y$ and $\theta_X$ control devices; and a rotational speed detecting means for detecting a rotational speed of the rotary shaft, each of the control devices comprising a break frequency and gain value varying means which has a break, frequency not larger than a response frequency of the entire control apparatus with respect to the cross feedback signal, the varying means varying the break frequency of the lowpass filter in inverse proportion to the rotational speed the rotary shaft detected by the detecting means, and varying a gain value of the cross feedback signal in proportion to a rotational speed of the rotary shaft detected by the detecting means.

In the case where the control system of the rotational motion deteriorates due to the gyro-effect, the response deterioration appears strongly when the frequency is considerably lower than the response frequency of the control system. On the contrary, a slight response deterioration caused by the cross feedback is brought about in the vicinity of the response frequency of the control system when the cross feedback is performed to compensate for the gyro-effect. Therefore, according to the present invention, since the break frequency and gain value varying means having a proper break frequency is provided for the cross feedback, the gyro-effect is compensated for to the same extent as in the conventional case. Since the cross feedback is not effected in the vicinity of the response frequency of the control system, the response deterioration resulting from the cross feedback is prevented.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

Before the description of the present invention proceeds, it is to be noted that like parts are designated by like reference numerals throughout the accompanying drawings.

A control apparatus of a magnetic bearing according to one preferred embodiment of the present invention will be depicted hereinbelow with reference to FIGS. 1, 2, and 3.

The almost entire structure of the control apparatus of the present embodiment is the same as that of the conventional example described with reference to FIG. 4, and the description thereof will be abbreviated here.

Figure 1:
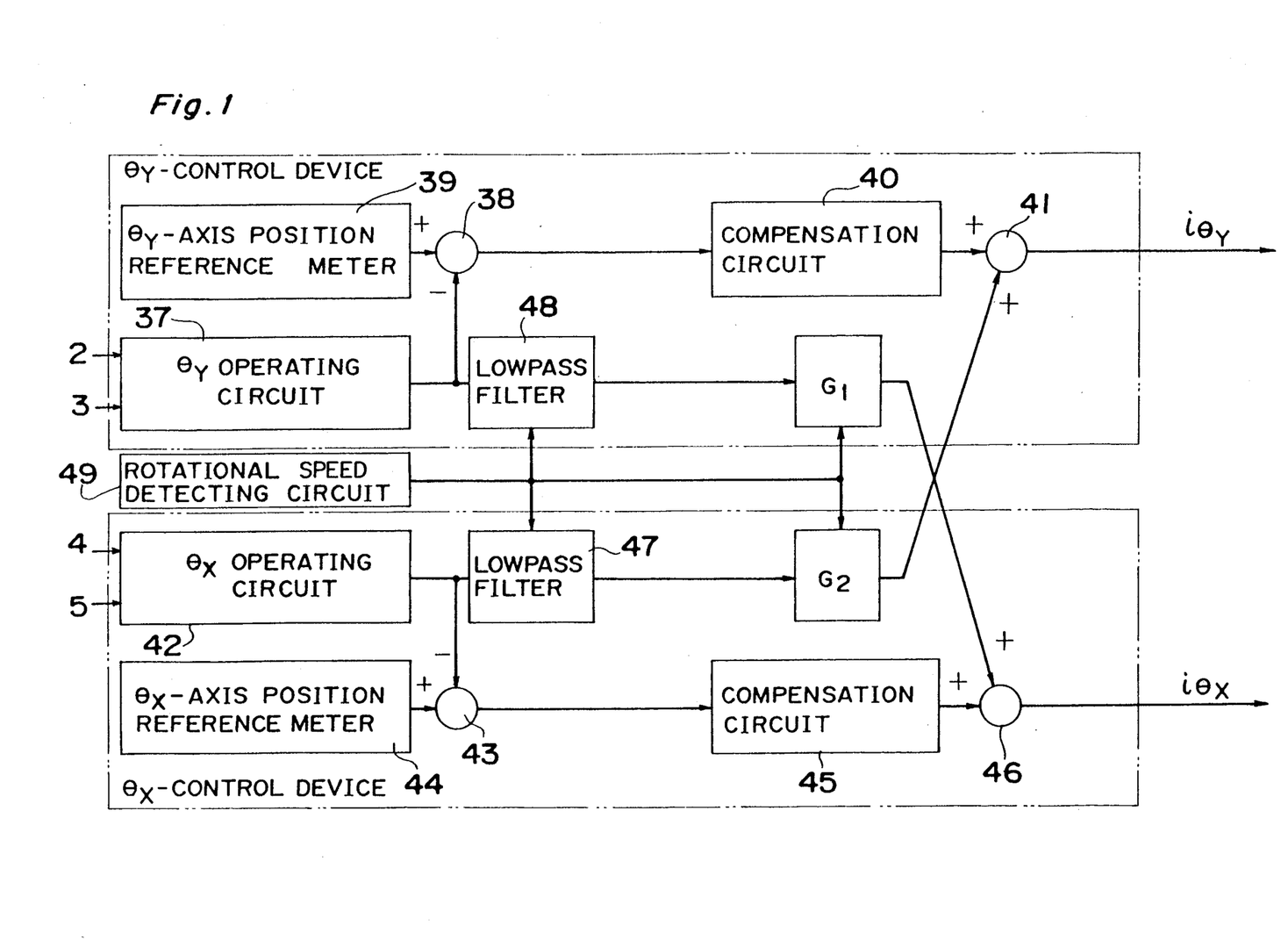
FIG. 1 is a block diagram,. of a rotational motion control apparatus in accordance with one preferred embodiment of the present invention.
Figure 2:
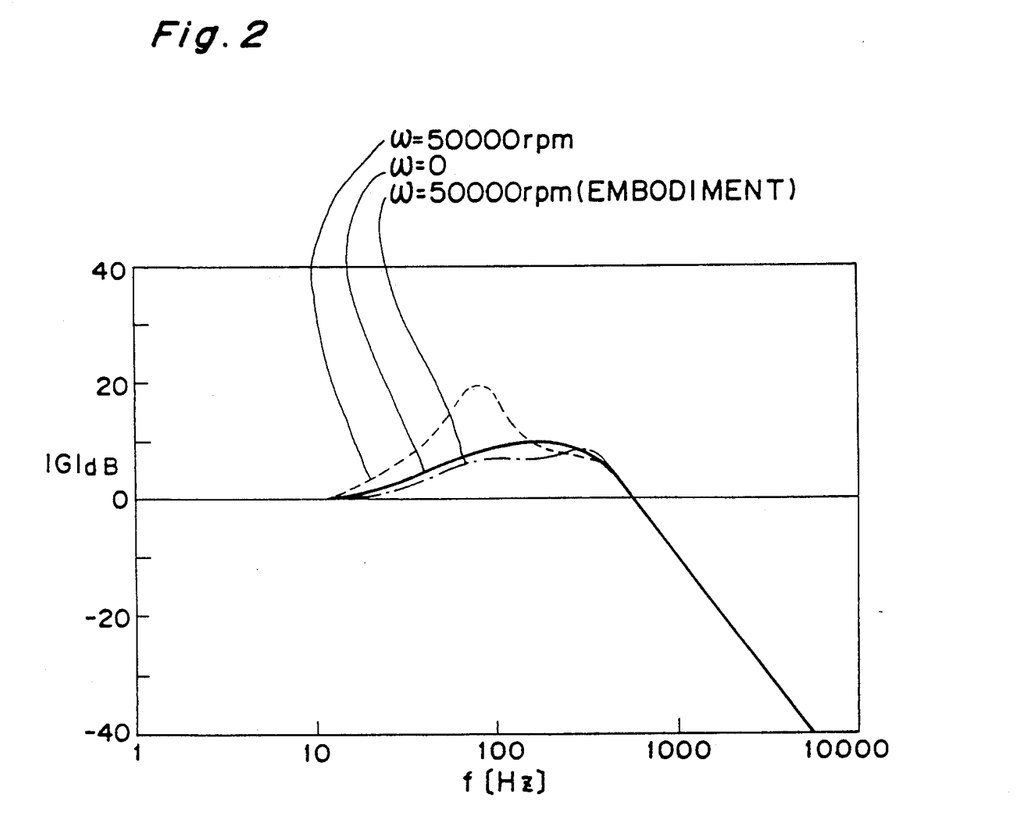
FIG. 2 is a diagram of a gain of a closed-loop transfer function of a rotational motion control system for explanation of the effect of the embodiment.

FIG. 1 is a block diagram of control devices of $\theta_Y$ and $\theta_X$ rotational motions. A $\theta_Y$ operating circuit 37 operates a rotary displacement $\theta_Y$ around the center of gravity of a rotary shaft 1 from output signals of the x-axis displacement sensors 2 and 3 and outputs the obtained displacement to a deviation circuit 38. The deviation circuit 38 obtains the difference of the rotary displacement $\theta_Y$ from a $\theta_Y$axis position reference signal generated from a $\theta_Y$-axis position reference meter 39, and outputs a deviation signal to a compensation circuit 40. The compensation circuit 40 processes the deviation signal by P.I.D. compensation or phase compensation, etc., and outputs the resultant control signal to an adder 41.

Similarly, a $\theta_X$ operating circuit 42 of a $\theta_X$-axis control device operates a rotary displacement $\theta_X$ around the center of gravity of the rotary shaft 1 from output signals of the y-axis displacement sensors 4 and 5, and outputs a signal to a deviation circuit 43. The deviation circuit 43 obtains the difference between the rotary displacement $\theta_X$ and a $\theta_X$-axis position reference signal output from a $\theta_X$-axis position reference meter 44, and outputs a deviation signal to a compensation circuit 45. The deviation signal is processed by P.I.D. compensation or phase compensation, etc. in the compensation circuit 45, resulting in a control signal which is in turn output to an adder 46.

Although the two degrees of freedom for the rotational motion are stabilized in the above manner of control, the present embodiment features a control means for compensating for the gyro-effect during rotation at high speeds. More specifically, a lowpass filter 47 is provided to allow only a low frequency region of a signal of the rotary displacement $\theta_X$ to pass. The output signal from the lowpass filter 47 is multiplied by a gain $(-G_2)$ and then, the obtained signal is added to the $\theta_Y$ control signal from the compensation circuit 40 in an adder 41, so that a current instruction $i\theta_Y$ is generated. Further, another lowpass filter 48 is provided to allow only a low frequency region of a signal of the rotary displacement $\theta_Y$ to pass. The output signal from the lowpass filter 48 is multiplied by a gain $(G_1)$ and then, the obtained signal is added to the $\theta_X$ control signal from the compensation circuit 45 in an adder 46, thereby outputting a current instruction $i\theta_X$.

The effect of the aforementioned arrangement will be explained with reference to FIG. 2 in terms of a transfer function of the rotational motion control system. FIG. 2 is a gain diagram of a closed-loop transfer function of the rotational motion control system. A frequency response indicated by a solid line is a closed-loop transfer function of the rotational motion control system when, the rotary shaft 1 is rotated at a rotational speed ω of 0. A peak value is 10dB (f=200 Hz). When the rotary shaft 1 is rotated at ω=50000 rpm, the closed-loop transfer function of the control system becomes as indicated by a dotted line and a peak value is 20dB (f=85 Hz), whereby the control system becomes unstable. However, if the rotary shaft 1 is rotated at ω=50000 rpm while the break frequency $f_C$ of the lowpass filters 47 and 48 is set to 120 Hz, the closed-loop transfer function of the rotational motion control system becomes as shown by an alternate long and short dashed line in the drawing. That is, the unstable state due to the gyro-effect is restricted in the entire frequency region, and unlike the conventional cross feedback method, the control efficiency is not deteriorated even in a relatively high frequency region.

The break frequency $f_C$ of the lowpass filters 47 and 48 of the control apparatus be kept within the range $$f_1 \leq f_c \leq 10^A, A = (\log f_1 + \log f_2)/2 \quad (1)$$

wherein $f_1$ is a frequency at the peak value generated by the gyro-effect ($f_1 = 85$ Hz according to the instant embodiment), and $f_2$ is a frequency at the peak value in the conventional cross feedback method ($f_2 = 400$ Hz according to the instant embodiment).

In the rotational apparatus of the magnetic bearing with the maximum rotational speed of 50000 rpm, it is possible to be required to rotate the bearing at the middle rotational speed in accordance with the purpose of the use. During the middle rotational speed i.e. from 0 rpm to 50000 rpm, a break frequency $f_c$ of the lowpass filters 47 and 48 is shown in FIG. 3.

Firstly, a break frequency $f_{c \cdot \omega max}$ of the lowpass filters 47 and 48 at the maximum rotation speed within the region of the equation (1) is set. A break frequency $f_c$ of the lowpass filters 47 and 48 at the middle rotational speed is expressed by the following equation (2):

$$f_c \approx f_0 + [(f_0 - f_{c \cdot \omega max})/\omega \max] \cdot \omega \quad (2)$$

wherein ω max: a maximum rotational speed, ω: an actual rotational number, and f: a peak frequency in the control system at the rotational speed of 0.

The variable gains $G_1$ and $G_2$ of the cross feedback are set by the following equation (3):

$$G_i = a^* \omega, i = 1, 2 \quad (3)$$

wherein "a" is a proportionality constant and "ω" is a rotational speed. That is, the cross feedback gains $G_1$ and $G_2$ vary in proportion to the rotational speed.

Figure 3:
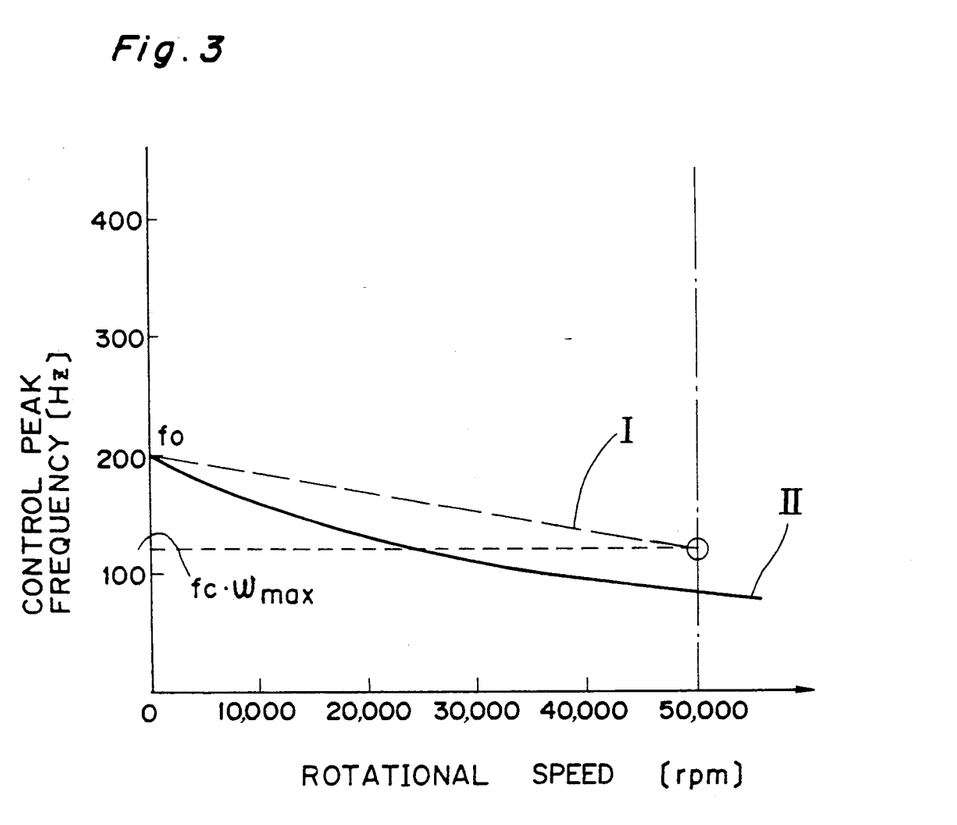
FIG. 3 is a diagram showing a break frequency of a lowpass filter and a peak frequency in a control system without a cross feedback arrangement.

As shown by a dotted line "I" in FIG. 3, the break frequency of the lowpass filters 48 and 49 is changed based on the equation (2) in accordance with a signal for indicating the rotational speed of the rotary shaft detected by a rotational detecting circuit 49 in FIG. 1. The gain values are changed, by the gains $G_1$ and $G_2$, based on the equation (3) in accordance with the same signal for indicating the rotation speed. In FIG. 3, a peak frequency in the control system without cross feedback is shown by a solid line "II."

In the embodiment, the lowpass filters 47 and 48 each of which has the break frequency not larger than the response frequency the entire rotational motion control system with respect to the signal, and varies the break frequency in inverse proportion to the rotational speed of the rotary shaft detected by the rotational speed detecting circuit 49; and the gains $G_1$ and $G_2$ for varying the gain values of the cross feedback signal in proportion to a rotational speed of the rotary shaft detected by the detecting circuit 49 constitute a break frequency and gain value varying means. Alternatively, lowpass filters having the above function of the lowpass filters 47 and 48 and the function of the gains $G_1$ and $G_2$ for varying the gain values of the cross feedback signal in proportion to a rotational speed of the rotary shaft detected by the detecting means can constitute the break frequency and gain value varying means.

As is made clear from the foregoing description of the present invention, in comparison with the conventional gyro-effect compensation method whereby the rotational motion control system is deteriorated in the vicinity of the response frequency, it becomes possible to restrict the unstable state of the magnetic bearing due to the gyro-effect in the entire frequency region and the entire region of the rotating speed without deteriorating the control efficiency.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A control apparatus of a magnetic bearing which controls electromagnets so that both a displacement deviation of a center of gravity of a rotary shaft and an angle of twist around the center of gravity of the rotary shaft become 0, thereby supporting the rotary shaft in space by a magnetic force of the electromagnets, the apparatus comprising:

$\theta_X$ and $\theta_Y$ control devices for controlling rotary angles $\theta_X$ and $\theta_Y$ of twist of two degrees of freedom of a rotational motion orthogonal to each other around the center of gravity and perpendicular to an axial direction of the rotary shaft, both a feedback signal of the rotary angle $\theta_X$ and a feedback signal of the rotary angle $\theta_Y$ being respectively fed back as cross feedback signals to the $\theta_Y$ and $\theta_X$ control devices; and a rotational speed detecting means for detecting a rotational speed of the rotary shaft;

each of the control devices comprising a break frequency and gain value varying means which has a break frequency not larger than a response frequency of the entire control apparatus with respect to the cross feedback signal, the varying means varying the break frequency in inverse proportion to the rotational speed of the rotary shaft detected by the detecting means, and varying a gain value of the cross feedback signal in proportion to the rotational speed of the rotary shaft detected by the detecting means.

2. The control apparatus as claimed in claim 1, wherein the break frequency and gain value varying means comprises:

a lowpass filter having the break frequency not larger than the response frequency of the entire control apparatus with respect to the cross feedback signal, and varying the break frequency in inverse proportion to the rotational speed of the rotary shaft detected by the detecting means; and a gain value varying means for varying the gain value of the cross feedback signal in proportion to the rotational speed of the rotary shaft detected by the detecting means.

3. The control apparatus as claimed in claim 2, wherein the lowpass filter varies the break frequency in inverse proportion to the rotational speed of the rotary shaft, in accordance with the following equation:

$$f_c \approx f_0 + [(f_0 - f_{c \cdot \omega\, max})/f\, max] \cdot \omega$$

wherein $f_c$ is the break frequency, $\omega$ max: a maximum rotational speed, $\omega$: an actual rotational speed, $f_c \cdot \omega$ max: a break frequency at a rotational speed $\omega$ max, and $f_0$: a peak frequency at a rotational speed of 0.

4. The control apparatus as claimed in claim 2, wherein the gain varies the gain value G in accordance with the following equation:

$$G = a \cdot \omega,$$

wherein "a" is a proportionality constant and "$\omega$" is the rotational speed.

* * * * *